United States Patent Office 3,699,092
Patented Oct. 17, 1972

3,699,092
THIAZOLYL-MONOAZO-TETRAHYDRO-QUINOLINE DYES
Max A. Weaver and David J. Wallace, Kingsport, Tenn., assignors to Eastman Kodak Company, Rochester, N.Y.
No Drawing. Filed Jan. 11, 1967, Ser. No. 608,486
Int. Cl. C09b 29/36
U.S. Cl. 260—155  8 Claims

ABSTRACT OF THE DISCLOSURE

Thiazolyl-azo-tetrahydroquinoline compounds, containing a cyclic group of the formula

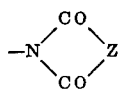

wherein Z represents —NH—NH— or a chain of carbon atoms and at least one oxygen or sulfur atom or a group having the formula

wherein $R^2$ represents hydrogen or alkyl, are useful as dyes for hydrophobic textile materials.

---

This invention relates to certain novel water-insoluble thiazolyl compounds and, more particularly, to water insoluble thiazolylazo compounds useful as dyes for hydrophobic textile fibers, yarns and fabrics.

The novel azo compounds of the invention are characterized by the general formula I
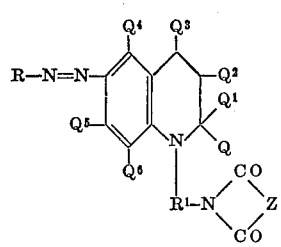

wherein

R represents a 2-thiazolyl group;
$R^1$ represents an alkylene group;
Q, $Q^1$, and $Q^3$ are the same or different and each represents hydrogen or alkyl;
$Q^2$ represents hydrogen, alkyl, alkoxy, halogen, hydroxy, or alkanoyloxy;
$Q^4$ represents hydrogen, alkyl, alkoxy, halogen, or, when $Q^5$ represents hydrogen or alkyl, phenyl;
$Q^5$ represents hydrogen, alkyl, alkoxy, halogen, alkanoylamino, alkylsulfonamido, dialkylamino, or, when $Q^4$ represents hydrogen or alkyl, phenyl;
$Q^6$ represents hydrogen, alkyl, alkoxy, or halogen; and Z represents a chain of 2 to about 4 atoms consisting of carbon and at least one oxygen or sulfur atom or a group having the formula

wherein $R^2$ represents hydrogen or lower alkyl or Z represents a —NH—NH— group.

The compounds of the invention give red to blue dyeings on hydrophobic textile materials such as cellulose acetate and polyester fibers when applied thereto by conventional means. When used as dyes, the compounds of the invention in general display excellent fastness to light and sublimation, the latter property being of considerable importance when the compounds are applied to polyester fibers by the heat fixation technique of dyeing. Since the compounds of the invention are water insoluble, they should be free of water-solubilizing groups such as sulfo and carboxyl.

Typical of the groups represented by R are 2-thiazolyl, 5-nitro-2-thiazolyl, 4-methyl-2-thiazolyl, 4-phenyl-2-thiazolyl, 4-trifluoromethyl-2-thiazolyl, 4-acetamido-2-thiazolyl, 4-methyl-5-nitro-2-thiazolyl, 5-chloro-2-thiazolyl, 4-ethoxycarbonyl-2-thiazolyl, 5-methylsulfonyl-2-thiazolyl, etc. Preferred groups represented by R are represented by the formula

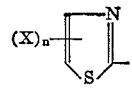

wherein X represents lower alkyl, e.g. having up to about 4 carbon atoms such as methyl, ethyl, propyl, isopropyl, butyl; lower alkyl substituted with halogen, e.g. chloro, bromo, trifluoromethyl; cyano; nitro, hydroxy, phenyl; lower alkoxy, e.g. having up to about 4 carbon atoms such as methoxy, ethoxy, butoxy; lower alkoxy substituted with the substituents described above relative to substituted lower alkyl; lower alkanoylamino, e.g. acetamido, propionamido; nitro, halogen, e.g. chloro, bromo; cyano; lower alkylsulfonyl, e.g. methylsulfonyl, butylsulfonyl; substituted lower alkylsulfonyl, such as cyanoalkylsulfonyl; lower alkoxycarbonyl, e.g. methoxycarbonyl, ethoxycarbonyl, butoxycarbonyl; carbamoyl, N-lower alkylcarbamoyl, e.g. N-methylcarbamoyl, N,N-di-lower alkylcarbamoyl, e.g. N,N-diethylcarbamoyl; phenyl; benzamido; hydroxyl; lower alkanoyl, e.g. acetyl, propionyl, butyryl; sulfamoyl; N- and N,N-di-lower alkylsulfamoyl, e.g. N-propylsulfamoyl, N,N-diethylsulfamoyl, lower alkylsulfonamido, e.g. methylsulfonamido, ethylsulfonamido; thiocyanato; and lower alkylthio, e.g. methylthio, propylthio, and $n$ represents 0, 1, or 2. When $n$ represents 2, the groups represented by X can be the same or different.

The alkylene groups represented by $R^1$ can be straight or branched chain, unsubstituted or substituted alkylene of up to about 8 carbon atoms. Preferably, $R^1$ represents a lower alkylene group having up to about 4 carbon atoms. Examples of the alkylene groups represented by $R^1$ are ethylene, propylene, isopropylene, n-butylene, isobutylene, hexamethylene, haloalkylene, e.g. 2-chloropropylene, 2-bromopropylene, chloroethylene, hydroxyalkylene, e.g. 2-hydroxypropylene, hydroxyethylene, lower alkanoyloxyalkylene, e.g. 2-acetoxypropylene, etc.

The alkyl and alkoxy groups which each of Q, $Q^1$, $Q^2$, $Q^3$, $Q^4$, $Q^5$ and $Q^6$ can represent can contain up to about 8 carbon atoms and can be straight or branched chain. Preferably, these alkyl and alkoxy groups contain up to about 4 carbon atoms, i.e. lower alkyl and lower alkoxy. Examples of the alkyl and alkoxy groups which can be present on the tetrahydroquinoline nucleus are methyl, ethyl, propyl, isopropyl, n-butyl, isobutyl, amyl, hexyl, 2-ethylhexyl, methoxy, ethoxy, propoxy, butoxy, hexoxy, etc.

Typical halogen atoms which $Q^2$, $Q^4$, $Q^5$ and $Q^6$ can represent are chloro and bromo. Examples of the alkanoyloxy groups which $Q^2$ can represent are alkanoyloxy of up to about 8 carbon atoms such as acetoxy, propionoxy, butyroxy, etc. Preferably, the alkanoyloxy group which can be represented by $Q^2$ is lower alkanoyloxy, i.e. having up to about 4 carbon atoms.

The alkyl moiety of each of the alkanoylamino, alkylsulfonamido, or dialkylamino groups which $Q^5$ can represent can contain up to about 8 carbon atoms, preferably up to about 4 carbon atoms. Illustrative of alkanoylamino groups are acetamido, propionamido, butyramido, etc. Exemplary alkylsulfonamido groups include methylsulfonamido, ethylsulfonamido, propylsulfonamido, butylsulfonamido, hexylsulfonamido, etc. As mentioned above, each of the alkyl groups present on the dialkylamino group which $Q^5$ can represent can contain up to about 8 carbon atoms, e.g. methyl, ethyl, propyl, butyl, hexyl, etc. Typical of the dialkylamino groups are dimethylamino, diethylamino, butylmethylamino, etc.

The carbon atoms in the chain of atoms represented by Z can be substituted with lower alkyl, e.g. methyl, ethyl, butyl; lower alkyl substituted with halogen, hydroxy, lower alkanolyloxy; lower alkoxy, e.g. methoxy, ethoxy; halogen, etc.

The following groups are illustrative of the groups represented by Z:

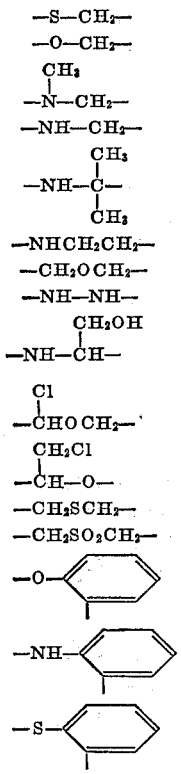

As is well known in the art, the color of the compounds of the invention is attributable to the conjugated thiazolylazo-tetrahydroquinoline system. Thus, it is apparent that the substituents present on the thiazolyl group represented by R and the alkylene group represented by $R^3$ and the groups represented by $R^1$, $R^2$, and Z, as these groups are defined above, do not materially affect the usefulness of the compounds as dyes, i.e. the ability of the compounds to dye hydrophobic textile materials. As can be seen from the subsequent examples, the substituents on the thiazolyl and tetrahydroquinoline rings function primarily as auxochrome groups to control the shade of the compounds of the invention.

A preferred groups of the novel azo compounds of the invention have the formula

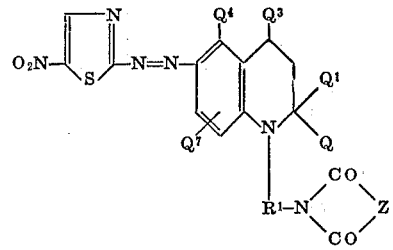

wherein Q, $Q^1$, $Q^3$, $Q^4$, and $Q^7$ are the same or different and each represents hydrogen or lower alkyl, $R^1$ represents lower alkylene, especially ethylene, and Z represents —$CH_2S$—, —$CH_2NH$—, —$CH_2OCH_2$—, or

—$CH_2CH_2NH$—

The azo compounds of the invention are prepared by diazotizing appropriate 2 - aminothiazoles represented by R in Formula I and coupling the thiazolylazo compound obtained with an appropriate coupling component.

Exemplary 2 - aminothiazoles, illustrated by R in Formula I, include 2 - amino - 5 - nitrothiazole, 2-amino-4-trifluoromethylthiazole, 2 - amino - 4 - methylthiazole, 2 - amino - 4 - carbethoxyethylthiazole, 2 - amino - 4- acetamidothiazole, 2 - amino - 4 - phenylthiazole, 2-amino - 5 - bromothiazole, 2 - amino - 5 - n - butylsulfonylthiazole, 2 - amino - 4 - methyl - 5 - acetylthiazole, 2 - amino - 5 - cyanothiazole and the like.

The dicarboximidoalkyl tetrahydroquinoline coupling components which are coupled with the diazotized 2-aminothiazoles described above are characterized by the formula

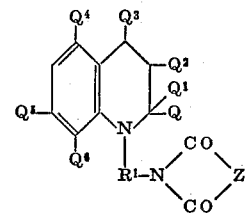

wherein $R^1$, Q, $Q^1$, $Q^2$, $Q^3$, $Q^4$, $Q^5$, $Q^6$ and Z are defined above. They are prepared by reacting an appropriate N-aminoalkyl-1,2,3,4 - tetrahydroquinoline compound with the appropriate dicarboxylic acid or dicarboxylic acid anhydride, or by reacting appropriate N-haloalkyl-1,2,3,4-tetrahydroquinoline compounds with compounds of the structure

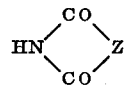

wherein Z is defined above, in the presence of an acid acceptor such as potassium carbonate. The compounds from which the group

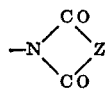

is derived are well known in the literature.

Representative coupling components illustrated by Formula II, above, include

3-[2-(1,2,3,4-tetrahydro-2,2,4,7-tetramethyl-1-quinolyl)ethyl]hydantoin,
5,6-dihydro-3-[2-(1,2,3,4-tetrahydro-2,2,4,7-tetramethyl-1-quinolyl)ethyl]-uracil,
4-[2-(1,2,3,4-tetrahydro-1-quinolyl)ethyl]-3,5-morpholinedione,
3-[2-(1,2,3,4-tetrahydro-2,2,4,7-tetramethyl-1-quinolyl)-ethyl]-2,4-thiazolidinedione and the like.

The following examples will serve to illustrate the preparation of representative intermediates and azo compounds of our invention.

PREPARATION OF COUPLERS

Preparation of 3[2-(1,2,3,4-tetrahydro-2,2,4,7-tetramethyl-1-quinolyl)ethyl]hydantoin An amount of 25.2 g. N - 2 - chloroethyl-1,2,3,4-tetrahydro-2,2,4,7 - tetramethylquinoline, 10.0 g. hydantoin, 13.8 g. potassium carbonate, and 100 ml. dry dimethylformamide are stirred and refluxed together for 2 hr. The reaction mixture is drowned in water. The product is collected by filtration and recrystallized from 250 ml. alcohol. There is obtained 21.0 g. of product with a melting point of 183–184° C. It has the structure:

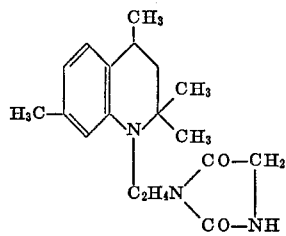

Preparation of 5,6-dihydro-3-[2-(1,2,3,4-tetrahydro-2,2,4,7-tetramethyl-1-quinolyl)ethyl]uracil An amount of 25.2 g. N - 2 - chloroethyl - 1,2,3,4-tetrahydro - 2,2,4,7 - tetramethylquinoline, 11.4 g. dihydrouracil, 13.8 g. potassium carbonate, and 100 ml. dimethylformamide are refluxed together for 2 hr. Drowning into water, filtering, and recrystallizing from methyl Cellosolve gives 20.8 g. of product with M.P. 219–220° C. having the structure:

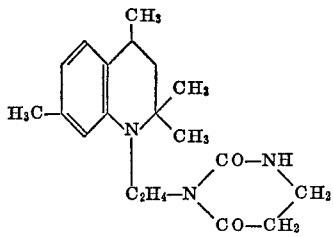

Preparation of 4-[2-(1,2,3,4-tetrahydro-1-quinolyl)ethyl]-3,5-morpholinedione

An amount of 17.6 g. N - (2 - aminoethyl - 1,2,3,4-tetrahydroquinoline) and 13.4 g. diglycolic acid are heated together at 155–160° C. for 1 hr. The reaction mixture is then poured into warm ethanol and the mixture heated until solution is complete. The product crystallizes on cooling and is collected by filtration. Yield=15.0 g., M.P. 132–134° C. The coupler has the structure:

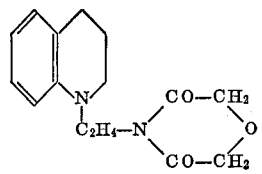

Preparation of 3-[2-(1,2,3,4-tetrahydro-2,2,4,7-tetramethyl-1-quinolyl)ethyl]-2,4-thiazolidinedione An amount of 25.2 g. 1 - (2 - chloroethyl - 1,2,3,4-tetrahydro - 2,2,4,7 - tetramethylquinoline, 11.7 g. 2,4-thiazolidine dione, 13.8 g. potassium carbonate, and 100 ml. dimethylformamide are heated together at 125–130° C. for 1 hr. The reaction mixture is then drowned into 500 ml. of water and the product is collected by filtration. Recrystallization of the crude product from methyl Cellosolve gives 21.5 g. product, melting at 175–180° C. It has the structure:

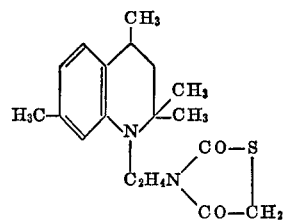

PREPARATION OF THE DYES

Example 1

(a) Diazotization—1.45 g. 2 - amino - 5 - nitrothiazole is dissolved in 12.5 ml. water plus 6.8 ml. conc. $H_2SO_4$. The resulting solution is cooled and a solution of 0.72 $NaNO_2$ in 5 ml. conc. $H_2SO_4$ is added at —10 to —5° C. The diazotization reaction is stirred 10 minutes longer at —10° C.

(b) Coupling—3.32 g. 3 - [2 - (1,2,3,4 - tetrahydro-2,2,4,7 - tetramethyl - 1 - quinolyl)ethyl] - 2,4 - thiazolidinedione is dissolved in 100 ml. 1:5 acid (1 part propionic:5 parts acetic). The coupling solution is cooled in an ice bath and the diazonium solution from (a) above is added, with stirring. After coupling 1 hr., the mixture is drowned with water, filtered, washed with water and dried. The product dyes cellulose acetate and polyester fibers deep blue shades having good light and sublimation fastness. The product has the following structure:

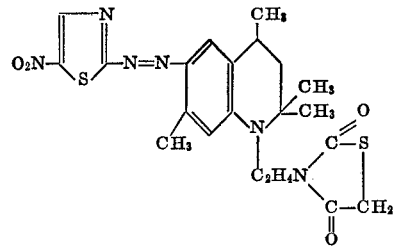

Example 2

2 - amino - 5 - nitrothiazole (1.45 g.) is diazotized as in 1(a) above and added to a cooled solution of 2.74 g. 4 - [2 - (1,2,3,4 - tetrahydro - 1 - quinolyl)ethyl] - 3,5-morpholinedione dissolved in 25 ml. 1:5 acid plus 25 ml. 15% $H_2SO_4$. After coupling 1 hr. the mixture is drowned with water, filtered, washed with water and the product is air dried. It dyes polyester fibers deep shades of blue with good fastness to light and sublimation. The product has the following structure:

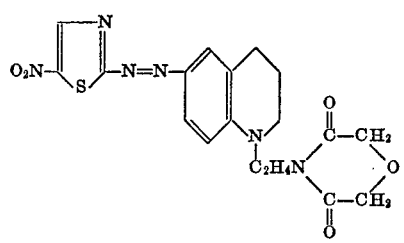

Example 3

An amount of 1.45 g. 2 - amino - 5 - nitrothiazole is diazotized as in Example 1 and added to a chilled solution of 3.15 g. 3 - [2 - (1,2,3,4 - tetrahydro - 2,2,4,7 - tetramethyl - 1 - quinolyl)ethyl]hydantoin in 60 ml. 15% sulfuric acid plus 40 ml. 1:5 acid (1 part propionic:5 parts acetic). After coupling 1 hr., the mixture is drowned with water, filtered, washed with water, and dried in air. The product dyes polyester fibers blue shades having excellent sublimation fastness. It has the structure:

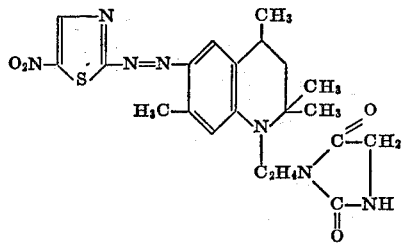

Example 4

An amount of 1.45 g. 2 - amino - 5 - nitrothiazole is diazotized and coupled with 3.02 g. 4 - [2 - (2,7 - dimethyl - 1,2,3,4 - tetrahydro - 1 - quinolyl)ethyl] - 3,5-morpholinedione in 100 ml. 1:5 acid as described in Example 1. The product dyes cellulose acetate and polyester fibers deep shades of blue. It has the structure:

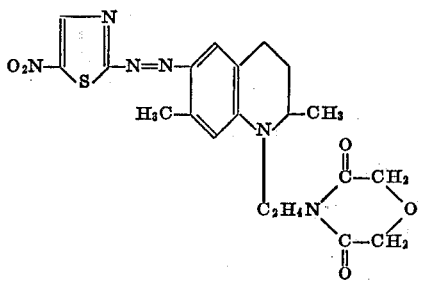

Example 5

An amount of 1.45 g. 2 - amino - 5 - nitrothiazole is diazotized and coupled with 3.30 g. 3 - [2 - (7 - acetamido-2 - methyl - 1,2,3,4 - tetrahydro - 1 - quinolyl)ethyl]hydantoin in 100 ml. 1:5 acid as illustrated in Example 1. The product dyes polyester fibers greenish-blue shades. It has the structure:

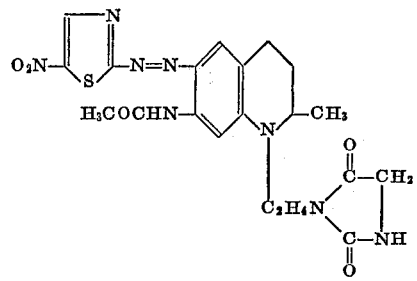

Example 6

An amount of 1.45 g. 2 - amino - 5 - nitrothiazole as diazotized and coupled with 2.62 g. 3 - [2 - (1,2,3,4-tetrahydro - 1 - quinolyl)ethyl]2,4 - thiazolidinedione dissolved in 50 ml. 1:5 acid, as illustrated in Example 1. The dye obtained dyes polyester fibers blue shades having good light fastness. It has the structure:

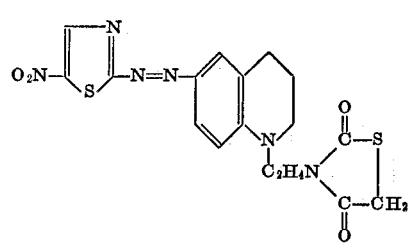

The thiazolylazo compounds illustrated in the following table are prepared by the procedure illustrated in Examples 1–6, above. Thus, the appropriate diazotized 2-aminothiazoles are coupled with suitable compounds of Formula II to obtain the compounds characterized by Formula I.

TABLE

| Example | X | Substituents on tetrahydroquinoline nucleus | R¹ | Z | Color |
|---|---|---|---|---|---|
| 7 | 5-NO₂ | 2,2,4,7-tetra-CH₃ | —CH₂CH₂— | —NHCH₂CH₂— | Blue. |
| 8 | 5-NO₂ | 2,7-di-CH₃ | —CH₂CH₂— | —OCH₂ | Do. |
| 9 | 5-NO₂ | 7-Cl-2,2,4-tri-CH₃ | —CH₂CH₂— | —CH₂OCH₂— | Violet. |
| 10 | 5-NO₂ | 7-Cl-2,2,4-tri-CH₃ | —CH₂CH₂— | —NHCH₂— | Do. |
| 11 | 5-NO₂ | 7-Cl-2,2,4-tri-CH₃ | —CH₂CH₂— | —S CH₂— | Do. |
| 12 | 5-NO₂ | 7-Cl-2,2,4-tri-CH₃ | —CH₂CH₂— | —O CH₂— | Do. |
| 13 | 5-NO₂ | 7-Cl-2,2,4-tri-CH₃ | —CH₂CH₂— | —NH—C(CH₃)₂— | Do. |
| 14 | 5-NO₂ | 7-OCH₃-2,2,4-tri-CH₃ | —CH₂CH₂— | —N(CH₃)—CH₂— | Blue. |
| 15 | 5-NO₂ | 7-OCH₃-2,2,4-tri-CH₃ | —CH₂CH₂— | —NH—NH— | Do. |
| 16 | 5-NO₂ | 7-OCH₃-2,2,4-tri-CH₃ | —CH₂CH₂— | —NH—C₆H₄— | Do. |
| 17 | 5-NO₂ | 7-OCH₃-2,2,4-tri-CH₃ | —CH₂CH₂— | —O—C₆H₄— | Do. |
| 18 | 5-NO₂ | 7-OCH₃-2,2,4-tri-CH₃ | —CH₂CH₂— | —NH—CH—CH₂OH | Do. |
| 19 | 5-NO₂ | 3-Cl-7-CH₃ | —CH₂— | —S CH₂— | Do. |
| 20 | 5-NO₂ | 7-CH₃-3-OCH₃ | —CH₂CH(CH₃)CH₂— | —S CH₂— | Do. |
| 21 | 5-NO₂ | 2,7-di-CH₃ | —CH₂CH(OH)CH₂— | —S CH₂— | Do. |

TABLE—Continued

| Example | X | Substituents on tetrahydroquinoline nucleus | R¹ | Z | Color |
|---|---|---|---|---|---|
| 22 | 5-NO₂ | 2,5,7-tri-CH₃ | —CH₂CH₂— | —S CH₂— | Do. |
| 23 | 5-NO₂ | 2,5,8-tri-CH₃ | —CH₂CH₂— | —NHCH₂— | Do. |
| 24 | 5-NO₂ | 7-NHCOCH₃ | —CH₂CH₂— | —NHCH₂— | Do. |
| 25 | 5-NO₂ | None | —CH₂CH₂— | —NHCH₂— | Do. |
| 26 | 5-NO₂ | ....do.... | —CH₂CH₂— | —CH₂S CH₂— | Do. |
| 27 | 5-NO₂ | ....do.... | —CH₂CH₂— | —CH₂S O₂CH₂— | Do. |
| 28 | 4-CF₃ | 2,7-di-CH₃ | —CH₂CH₂— | —CH₂S — | Red. |
| 29 | 4-CF₃ | 2,7-di-CH₃ | —CH₂CH₂— | —CH₂OCH₂— | Red. |
| 30 | 4-CH₃ | 2,7-di-CH₃ | —CH₂CH₂— | —CH₂OCH₂— | Red. |
| 31 | 4-COOC₂H₅ | 2,7-di-CH₃ | —CH₂CH₂— | —NHCH₂— | Red. |
| 32 | 4-NHCOCH₃ | 2,7-di-CH₃ | —CH₂CH₂— | —NHCH₂— | Red. |
| 33 | 4-C₆H₅ | 2,7-di-CH₃ | —CH₂CH₂— | —NHCH₂— | Red. |
| 34 | 5-Br | 2,7-di-CH₃ | —CH₂CH₂— | —NHCH₂— | Red. |
| 35 | 5-S O₂C₄H₉-n- | 2,7-di-CH₃ | —CH₂CH₂— | —NHCH₂— | Pink. |
| 36 | 4-CH₃, 5-CO-CH₃ | 2,7-di-CH₃ | —CH₂CH₂— | —NHCH₃— | Do. |
| 37 | 5-CN | 2,7-di-CH₃ | —CH₂CH₂— | —NHCH₂— | Violet. |
| 38 | None | 2,7-di-CH₃ | —CH₂CH₂— | —NHCH₂— | Red. |

As described above, the present compounds have the characteristic structure of Formula I, i.e. the presence of atoms other than carbon in the radical represented by Z. Thus the present compounds are distinct from similar compounds which contain only a carbon chain in a similar radical. This distinctive structure imparts unexpected properties to the compounds, including the above-described light fastness and sublimation resistance. Thus, we have found the compounds of the invention to have valuable properties when used as dyes and when tested by methods such as described in the A.A.T.C.C. Technical Manual, 1965 edition.

The thiazolylazo compounds of the invention can be used for dyeing hydrophobic fibers such as linear polyester, cellulose ester, acrylic polyamide, etc., fibers in the manner described in U.S. Pats, 2,880,050, 2,757,064, 2,782,187 and 3,043,827. The following example illustrates a method by which the compounds of the invention can be used to dye polyester textile materials.

EXAMPLE 39

An amount of 0.1 g. of the dye is dissolved in the dye pot by warming in 5 cc. of ethylene glycol monomethyl ether. A 2% sodium-N-methyl-N-oleyl taurate and 0.5% sodium lignin sulfonate aqueous solution is added, with stirring, until a fine emulsion is obtained. Water is then slowly added to a total volume of 200 cc. Then, 3 cc. of "Dacronyx" (a chlorinated benzene emulsion) are added and 10 grams of a textile fabric made of poly(ethylene terephthalate) fibers are entered. The fabric is worked 10 minutes without heat and then for 10 minutes at 80° C. The dye bath is then brought to the boil and held at the boil for one hour. Following this, the fabric is rinsed in warm water, then scoured in aqueous 0.2% soap, 0.2% soda ash solution. After scouring, the fabric is rinsed with water and dried.

When the compounds of the invention are used to dye polyamide textile materials, the above procedure can be employed except for "Dacronyx" dyeing assistant need not be used. When cellulose acetate fibers are dyed with the compounds, the above procedure can be followed omitting the "Dacronyx" dyeing assistant and carrying out the dyeing at 80° C. for one hour rather than at the boil.

Accordingly, since the thiazolylazo compounds of the invention are water-insoluble, they can be applied from aqueous dispersions in the manner of the so-called "dispersed dyes" according to the procedure described above. However, coloration can also be effected, for example, by incorporating the compounds into the spinning dope or melt and spinning the fiber as usual.

The compounds of the invention are not necessarily equivalent when used as dyes. The degree of dye affinity varies, for example, depending upon the material being dyed and the formula of the azo compound. Thus, for example, all the dyes will not have the same degree of affinity for the same material.

Polymeric linear polyester materials of the terephthalate type are illustrative of the linear aromatic polyester textile materials that can be dyed with the new compounds of our invention. Examples of linear polyester textile materials that can be dyed with the compounds of the invention are those prepared from ethylene glycol and dimethylterephthalate or from cyclohexanedimethanol and dimethylterephthalate. Polyesters prepared from cyclohexanedimethanol and dimethylterephthalate are more particularly described in U.S. Pat. 2,901,446. Poly(ethylene terephthalate) polyester fibers are described, for example, in U.S. Pat. 2,465,319. The polymeric linear polyester materials disclosed in U.S. Pats. 2,945,010, 2,957,745, and 2,989,363, for example, can be dyed. The linear aromatic polyester materials specifically named have a melting point of at least 200° C.

Examples of the polyamide fibers that can be dyed with the compounds of the invention are those consisting of nylon 66, made by the polymerization of adipic acid and hexamethylenediamine, nylon 6, prepared from epsilon-aminocaproic acid lactam, and nylon 8.

The invention has been described in considerable detail with particular reference to certain preferred embodiments thereof, but it will be understood that variations and modifications can be effected within the spirit and scope of the invention.

We claim:
1. A water-insoluble thiazolylazo compound having the formula

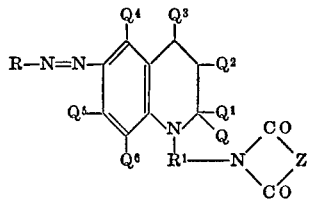

wherein
R represents a 2-thiazolyl group having the formula

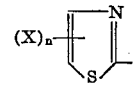

wherein X represents lower alkyl, nitro, chlorine, bromine, lower alkanoyl, lower alkanoylamino, lower alkylsulfonyl, trifluoromethyl, phenyl, or cyano; and n represents 0, 1 or 2;

R¹ represents lower alkylene, lower chloroalkylene, lower bromoalkylene, lower hydroxyalkylene, or lower alkanoyloxy-lower alkylene;

Q, Q¹ and Q³ are the same or different and each represents hydrogen or lower alkyl;

Q² represents hydrogen, lower alkoxy, chlorine, bromine, hydroxy, or lower alkanoyloxy;

Q⁴ represents hydrogen, lower alkyl, lower alkoxy, chlorine, bromine, or, when Q⁵ represents hydrogen or lower alkyl, phenyl;

Q⁵ represents hydrogen, lower alkyl, lower alkoxy, chlorine, bromine, lower alkanoylamino, lower alkylsulfonamido, di-lower-alkylamino, or, when $Q^4$ represents hydrogen or lower alkyl, phenyl;
$Q^6$ represents hydrogen, lower alkyl, lower alkoxy, chlorine, or bromine; and
Z represents —S—CH$_2$—, CH$_2$—O—CH$_2$—, —CH$_2$—NH—
—CH$_2$CH$_2$NH—, —O—CH$_2$—, —N(CH$_3$)—CH$_2$
—NH—C(CH$_3$)$_2$—, or —NH—NH—

2. A water insoluble thiazolylazo compound according to claim 1 having the formula

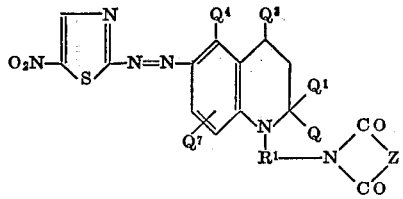

wherein $R^1$ represents lower alkylene, Q, $Q^1$, $Q^3$, $Q^4$, and $Q^7$ are the same or different and each represents hydrogen or lower alkyl, and Z represents —CH$_2$—S—, —CH$_2$—NH—, —CH$_2$—O—CH$_2$—
or —CH$_2$—CH$_2$—NH 3. A water insoluble thiazolylazo compound according to claim 2 wherein $R^1$ is ethylene.

4. A compound according to claim 1 having the formula

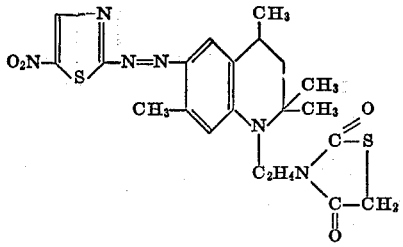

5. A compound according to claim 1 having the formula

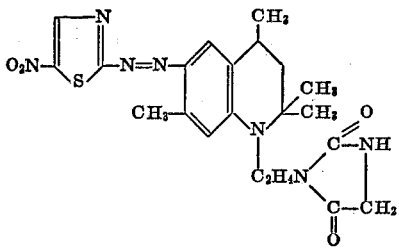

6. A compound according to claim 1 having the formula

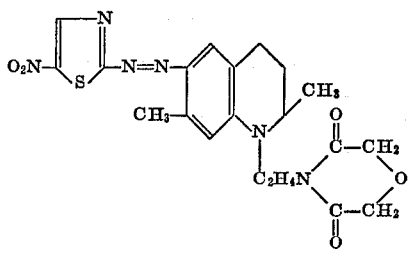

7. A compound according to claim 1 having the formula

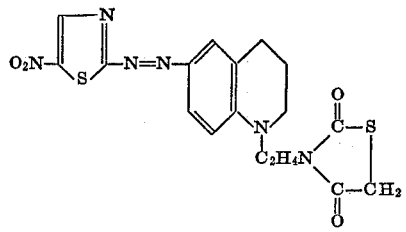

8. A compound according to claim 1 having the formula

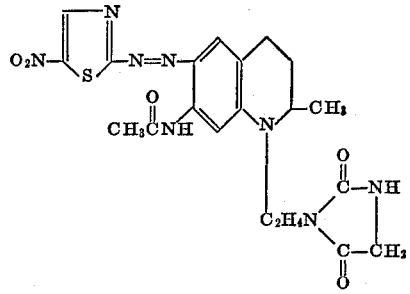

References Cited
UNITED STATES PATENTS
3,213,081  10/1965  Straley et al. _____ 260—155

JOSEPH REBOLD, Primary Examiner
D. M. PAPUGA, Assistant Examiner

U.S. Cl. X.R.
8—41 C, 173, 178; 260—203 S, 247.5 B, 256—4, 288 R